United States Patent [19]

Taylor et al.

[11] Patent Number: 4,623,691
[45] Date of Patent: Nov. 18, 1986

[54] MOULDING MATERIALS

[75] Inventors: David Taylor, Halesowen; Janet P. Griffiths, Warley, both of England

[73] Assignee: BIP Chemicals Limited, Manchester, England

[21] Appl. No.: 729,353

[22] Filed: May 1, 1985

[30] Foreign Application Priority Data

May 3, 1984 [GB] United Kingdom ................. 8411432

[51] Int. Cl.$^4$ ............................................. C08G 12/34
[52] U.S. Cl. .................................... 524/542; 524/597; 528/259; 528/260; 528/261
[58] Field of Search ................ 524/597, 542; 528/259, 528/260, 261

[56] References Cited

U.S. PATENT DOCUMENTS

| | | | |
|---|---|---|---|
| 2,809,954 | 10/1957 | Kazenas | 524/597 |
| 3,044,973 | 7/1962 | Segro | 524/542 |
| 3,712,879 | 1/1973 | Strickrodt | 528/259 |
| 3,855,173 | 12/1974 | Huck | 524/597 |
| 4,303,561 | 12/1981 | Piesch | 524/597 |
| 4,564,667 | 1/1986 | Taylor | 528/256 |

FOREIGN PATENT DOCUMENTS

| | | |
|---|---|---|
| 851378 | 10/1960 | United Kingdom . |
| 987655 | 3/1965 | United Kingdom . |
| 1027725 | 4/1966 | United Kingdom . |
| 1390370 | 4/1975 | United Kingdom . |
| 1406383 | 9/1975 | United Kingdom . |
| 1529053 | 10/1978 | United Kingdom . |
| 1554579 | 10/1979 | United Kingdom . |
| 1554580 | 10/1979 | United Kingdom . |

*Primary Examiner*—Paul R. Michl
*Attorney, Agent, or Firm*—Nixon & Vanderhyde

[57] ABSTRACT

An amino-formaldehyde moulding composition is made by compounding together an aqueous amino-formaldehyde resin solution to provide 0 to 90 percent by weight of the resin component of the composition, filler to make up 20 to 60 percent by weight of the moulding composition and UF resin which had a low degree of condensation, is solid at room temperature, contains a modifier and makes up 4 to 80 percent by weight of the moulding composition.

The moulding compositions themselves are also claimed.

15 Claims, No Drawings

MOULDING MATERIALS

This invention relates to moulding materials made from amino-formaldehyde resins, and particularly but not exclusively to such materials made from urea-formaldehyde resins.

Moulding materials made from urea-formaldehyde resins are well-known and have been in widespread use for many years. However, it has proved difficult to prepare materials which are suited to injection-moulding, especially when using urea-formaldehyde resins.

It has also been proposed in UK Pat. No. 1,390,370 to manufacture solid, low softening point resins by reacting together, in the absence of solvent, urea, paraformaldehyde and hexamethylene tetramine to produce an amorphous solid resin with a softening point within the range 60° C. to 100° C. and to use such solid resins to manufacture moulding materials. The drawback with this proposal is that the solventless reaction is difficult to control so that the product is not reproducible with the consistency needed for commercial use. The resin produced has a very irregular molecular distribution, containing substantial fractions of highly condensed materials, and subsequently unreacted products.

We have now found a method of making amino-formaldehyde moulding compositions incorporating urea-formaldehyde resins which have a beneficial effect upon the moulding materials produced, and do not require resins to be made from hexamethylene tetramine and paraformaldehyde.

Thus, according to the present invention there is provided a method for the manufacture of an amino-formaldehyde resin and filler in which the resin and filler are compounded together under such conditions as to leave the resin in a state in which it will flow and cure under heat and pressure and wherein the components of the composition which are compounded together comprise (a) an aqueous amino-formaldehyde resin solution which is used in an amount such as to provide curable amino-formaldehyde resin to make up 0 to 90 percent by weight of the resin component of moulding composition (b) at least one filler in an amount such as to make up 20 to 60 percent by weight of the moulding composition and (c) a urea-formaldehyde resin which is solid at room temperature and which has a low degree of condensation and a softening point in the range 50° C. to 90° C. and/or which is a product of reaction of at least, urea-formaldehyde and a modifier selected from the group consisting of organic amides, amino-triazines, reactive organic hydroxyl and reaction products of these compounds with formaldehyde, the solid resin making up 4 to 80 percent by weight of the moulding composition.

The aqueous amino-formaldehyde resin is preferably of the kind suitable for manufacture of moulding materials by the wet process. It is preferably a urea-formaldehyde resin, although other amino-resins may be used, and it may be a urea-formaldehyde resin into which another monomer has been reacted. The molar ratio of urea to formaldehyde is preferably in the range 1:1.1 to 1:1.7.

The aqueous resin is used in the form of a solution or syrup to which the other ingredients may be added, and such a syrup preferably has a dry solids content in the range 50% to 75%.

The filler which is used may be a mixture of fillers, and may be fibrous or particulate or a mixture of the two. Preferably the filler includes a cellulose filler, as is commonly used in amino-formaldehyde moulding powders. A particulate filler which is suitable is a precipitated cured melamine or urea-formaldehyde material such as those described in UK Pat. Nos. 1,422,158 and 1,529,053.

The solid urea-formaldehyde resin is made by reaction of urea and aqueous formaldehyde with subsequent removal of water, for example as described in UK Patent Application No. 84 04758, and has a low degree of condensation in order that it may remain suitable for plasticization and moulding after being compounded into the moulding material. By the expression low degree of consideration we mean a degree of condensation less than 45%, degree of condensation being:

$$\frac{\text{Total formaldehyde content (1)} - \text{Methylol formaldehyde content (2)}}{\text{Total formaldehyde content (1)}} \times 100$$

where
(1) is determined by acid hydrolysis with phosphoric acid followed by sulphite determination of liberated formaldehyde and
(2) is determined by the ACC sulphite method.

The degree of condensation of the solid resin may be as low as 25% but the preferred range is 30 to 43 percent.

The compounding of the ingredients may be accomplished in one of several ways. For instance the filler may be added to the aqueous resin in the usual manner utilised in the wet process for making moulding powders, and the solid resin may be added along with the filler. Alternatively the aqueous resin may be used to impregnate the filler, and the mixture dried and ground, only then adding the solid resin. If no aqueous resin is being used the filler and the solid resin may be compounded dry by conventional means.

In each case the usual additives such as pigments, curing agents, stabilisers, etc, may be included in the composition and compounded therein in conventional manner.

Thus the present invention provides also a moulding composition comprising a curable amino-formaldehyde resin and filler in which at least some of the curable amino-formaldehyde resin is incorporated into the composition as a curable solid urea-formaldehyde resin having a degree of condensation which is in the range 25 to 45 percent.

The solid urea-formaldehyde resin may contain as modifier a reactive organic hydroxyl compound, an organic amide or an amino-triazine compound such as melamine and/or the reaction products of these compounds with formaldehyde. The principal purpose of the modifier is to assist in the formation of a solid resin but compounds can be used for this purpose which also have useful effects on moulding compositions produced using the resin. Such compounds include p-toluene sulphonamide, sulphanilamide, acetamide and malonamide.

Other compounds which are effective modifiers include succinamide, dicyandiamide, phenol, ethylene glycol, o-cresol and melamine-formaldehyde resins. Mixtures of modifiers may also be used.

The total amount of modifier used is preferably such that units derived therefrom will comprise not more than 4 percent by weight of the resin, more preferably not more than 2.0 percent. It is to be noted, however that when the modifier is an amino-triazine such as melamine, or a reaction product of such a compound with formaldehyde the amount of modifier used can be substantially greater eg up to 20 percent by weight of the resin, if desired although this is not normally preferred. If such greater amounts of these modifiers are used the amount will not usually exceed 10 percent by weight of the resin.

The solid urea-formaldehyde resin preferably has a molar ratio of urea to formaldehyde which is in the range 1:1.2 up to 1:2.0 and more preferably in the range 1:1.3 up to 1:1.6.

In addition to the aqueous resin and solid resin mentioned above, other resins may be added to the moulding compositions of this invention in an amount of up to 20 percent by weight of the total resin in the composition. Resins which may be included must be compatible with the resins already mentioned and two particularly useful additive resins are polyester alkyd resins, often used with amino-formaldehyde resins in coating systems, and spray-dried melamine-formaldehyde resins which blend readily with the solid urea-formaldehyde resin. The latter are a particularly useful addition and will normally have a softening point in the range 70° to 120° C.

The moulding compositions of the invention and their method of manufacture will now be more particularly described by means of examples.

EXAMPLES 1 TO 3

In these examples a solid urea-formaldehyde resin was used as a process modifier in manufacture of moulding compositions by the wet process.

The aqueous resin used was a urea-formaldehyde resin syrup of 61.5% solids and a U:F molar ratio of 1:1.4. As filler cellulose was used and as solid UF resin a urea-formaldehyde resin of U:F ratio 1:1.41 containing as modifier 0.3% by weight of malonamide and 0.4% by weight of polypropylene glycol. The solid resin had a degree of condensation of 38%, and a softening point of 67° C.

Moulding compositions were made up as detailed in Table I (amounts being stated as parts by weight unless otherwise specified) by mixing the cellulose, solid resin and other ingredients into the resin syrup and then drying the resulting materials in tray ovens with regular turning of the materials.

TABLE I

| Example No. | 1 | 2 | 3 |
|---|---|---|---|
| Resin Content | | | |
| Urea formaldehyde aqueous resin (g) | 3800 | 2631 | 1325 |
| Solid urea formaldehyde resin (g) | | 639 | 1278 |
| Cellulose (g) | 1000 | 1000 | 1000 |
| Blancfixe (g) | 66 | 66 | 66 |
| Hexamine (g) | 48 | 48 | 48 |
| Zinc Stearate (g) | 11 | 11 | 11 |
| Polypropylene glycol (g) | 8.8 | 8.8 | 8.8 |
| Catalyst (B3 Masterbatch) (g) | 100 | 100 | 100 |

Table II below gives details of tests carried out on the moulding compositions produced, and of mouldings produced therefrom by compression moulding. Example 1 is a comparitive example in which no solid resin was used and it will be seen that the introduction of the solid resin gave a substantial reduction in drying time and reduction in disc flow without incurring major penalty in physical properties in the mouldings produced.

TABLE II

| Example No. | 1 | 2 | 3 |
|---|---|---|---|
| Percentage solid urea resin replacement % | 0 | 20 | 40 |
| Drymix flow (thou) | 0.57 | 0.54 | 0.47 |
| Disc flow (thou) | 0.43 | 0.35 | 0.38 |
| Percentage drying time saved % | 0 | 23.5 | 29.4 |
| Free water content % | 0.68 | 1.35 | 1.56 |
| Total Water Content % | 6.21 | 6.8 | 7.12 |
| Mould shrinkage (%) | 0.57 | 0.61 | 0.62 |
| After shrinkage (%) 48 hrs @ 80° C. | 0.207 | 0.17 | 0.22 |
| Unnotched Impact | 7.9 | 7.9 | 7.3 |
| Flexural Strength (MPa) | 110 | 106 | 103 |
| Flexural Modulus (GPa) | 9.7 | 8.7 | 9.3 |

EXAMPLES 4 TO 9

In these examples a urea-formaldehyde moulding composition was prepared by the wet process without solid resin addition and dried as in example 1. To the dry pre-grind composition were then added varying amounts of the solid urea-formaldehyde resin used in examples 2 and 3 and the dry materials were intimately mixed together by a dry densification process.

Table III below gives details of the amount of solid resin added, and the results of tests on the moulding powders produced, and on compression mouldings produced therefrom.

TABLE III

| Example No. | 4 | 5 | 6 | 7 | 8 | 9 |
|---|---|---|---|---|---|---|
| Solid urea resin addition (%) | 0 | 10 | 20 | 25 | 35 | 50 |
| Aqueous resin pregrind (%) | 100 | 90 | 80 | 75 | 65 | 50 |
| fibre content (%) | 28.2 | 25.38 | 22.56 | 21.15 | 18.3 | 14.25 |
| Disc flow (thou) | 024 | 018 | 011 | 008 | 005 | 002 |
| Orifice flow (sec) | N/F | N/F | 14 | 11 | 9 | 4 |
| Total water content % | 7.48 | 7.91 | 8.19 | 8.62 | 8.74 | 8.6 |
| Free water content % | 6.46 | 0.84 | 0.81 | 1.0 | 1.6 | 1.7 |
| Compression Mouldings | | | | | | |
| Boiling water absorption (mg) | 338.2 | 366.5 | 350.5 | | | |
| Cold water absorption (mg) | 67.8 | 64.7 | 63.4 | NOT MOULDABLE | | |
| Mould shrinkage (%) | 0.67 | 0.75 | 0.71 | | | |
| After shrinkage (%) 48 hrs @ 80° C. | 0.27 | 0.34 | 0.34 | | | |
| Flexural strength (MPa) | 107 | 110 | 100 | | | |
| Flexural modulus (GPa) | 9.1 | 8.6 | 8.2 | | | |

TABLE III-continued

| Example No. | 4 | 5 | 6 | 7 | 8 | 9 |
|---|---|---|---|---|---|---|
| Unnotched Impact Strength (KJ/m$^2$) | 7.3 | 7.4 | 8.2 | | | |

N/F = No Flow

Injection moulding tests were also undertaken with the series of moulding powders produced in Examples 1 to 9. Details of these are set out in Tables IV and V below from which it can be seen that the addition of the solid resin enhances considerably the mouldability of the material in the context of injection moulding, the advantageous range of addition of the solid resin being up to about 25% of the composition, beyond which the physical properties of the mouldings begin to be more severely affected.

TABLE IV

| Example No. | 4 | 5 | 6 | 7 | 8 | 9 |
|---|---|---|---|---|---|---|
| Percentage solid resin content (%) | 0 | 10 | 20 | 25 | 35 | 50 |
| Mould shrinkage (%) | 1.1 | 1.1 | 1.14 | 1.25 | 1.04 | 1.02 |
| After shrinkage (%) 48 hrs @ 80° C. | 0.56 | 0.76 | 0.9 | 0.47 | 0.83 | 1.05 |
| Boiling water absorption (mg) | 541 | 602 | 574 | 572 | 577 | 605 |
| Cold water absorption (mg) | 99 | 108 | 105 | 100 | 97 | 92 |
| Unnotched Impact Strength (KJ/m$^2$) | 5.8 | — | — | 11.4 | — | 9.7 |
| Flexural strength (MPa) | 130 | 157 | 169 | 148 | 127 | 106 |
| Flexural modulus (PGa) | 10.1 | 9.8 | 9.7 | 9.6 | 8.9 | 7.7 |
| Electric Strength (Mv/m) | 7.65 | 7.7 | 7.7 | 7.1 | 6.6 | 6.35 |
| Appearance | | | | | | |
| Weld lines Graded 0-5 | 5 | 3 | 2 | 1 | 0 | 0 |

0 = none
5 = very bad

TABLE V

| Example No. | 4 | 5 | 6 | 7 | 8 | 9 |
|---|---|---|---|---|---|---|
| Plaque Moulding | | | | | | |
| Apparent Cure (sec) | 15 | 15 | 15 | 15 | 20 | 20 |
| Injection fill time (sec) | 3.7 | 1.1 | 1.1 | 1.1 | 0.5 | 0.3 |
| Screw back time (sec) | 5 | 5 | 5.1 | 5.1 | 4.5 | 5 |
| Feed required (inch) | 2¼ | 2 | 1⅞ | 1⅝ | 1½ | 1½ |
| Mould shrinkage across the flow % | 0.95 | 1.1 | 1.2 | 1.2 | 1.1 | 1.2 |
| Mould shrinkage with the flow % | 1.24 | 1.1 | 1.1 | 1.3 | 1.0 | 0.91 |
| After shrinkage at 80° C. for 48 hrs | | | | | | |
| across the flow % | 0.54 | 0.4 | 0.62 | 0.47 | 0.87 | 1.1 |
| with the flow % | 0.58 | 1.12 | 1.2 | 0.42 | 0.8 | 1.0 |
| After shrinkage at 100° C. for 48 hrs | | | | | | |
| across the flow % | 0.81 | 0.96 | 0.98 | 1.42 | 1.25 | 1.56 |
| with the flow % | 0.84 | 1.2 | 1.25 | 0.87 | 1.03 | 1.0 |
| stoving at 80° C. days | 6 | 9 | 14 | 21 | 22 | 22 |
| stoving at 100° C. days | 5-7 | 6-7 | 6-7 | 6-7 | 6-7 | 6-7 |

These examples thus clearly show the benefits of adding the solid resin, especially when an injection moulding composition is desired.

EXAMPLES 10 TO 16

In these examples moulding compositions were made in the same way as in examples 4 to 9 by adding solid resin after the drying stage. In examples 10 to 16, however, example 10 is a comparitive example containing no solid urea-formaldehyde resin and in all the other examples a solid urea-formaldehyde resin was added with an additional filler (particulate or fibrous).

The solid resin in this case was a urea-formaldehyde resin containing 1.5% by weight of para-toluene sulphonamide as modifier and having a U:F molar ratio of 1:1.41. The degree of condensation was 34.6%, and the softening point of the resin was 64° C.

The aqueous resin and other ingredients were as detailed for example 1. Table VI below gives details of the compositions made up as examples 10 to 17.

TABLE VI

| Example No. | 10 | 11 | 12 | 13 | 14 | 15 | 16 |
|---|---|---|---|---|---|---|---|
| Aqueous resin pre-grind % | 100 | 50 | 75 | 50 | 50 | 50 | 50 |
| Solid urea resin % | 0 | 40 | 12.5 | 37.5 | 47.5 | 35 | 40 |
| Addition filler % | 0 | 10 | 12.5 | 12.5 | 2.5 | 15.5 | 10.5 |
| Type of filler added:- | | | | | | | |
| Powdered cellulose % | | 10 | | | | | |
| Wood flour % | | | | | | 15 | 10 |
| China clay % | | | 12.5 | | | | |
| Cotton flock % | | | | 12.5 | | | |
| 3 mm Terylene fibres % | | | | | 2.5 | | |
| Calcium carbonate % | | | | | | 0.5 | 0.5 |
| Pregrind fibre content % | 28.2 | 14.25 | 21.25 | 14.25 | 14.25 | 14.25 | 14.25 |
| Total fibre content % | 25.2 | 24.25 | 21.25 | 26.75 | 16.75 | 29.25 | 24.25 |
| Pregrind resin content % | 64.5 | 32.25 | 48.37 | 32.25 | 32.25 | 32.25 | 32.25 |
| Solid urea resin content % | — | 40 | 12.5 | 37.5 | 47.5 | 35 | 40 |
| Total resin content % | 64.5 | 72.25 | 60.87 | 69.75 | 79.75 | 67.25 | 72.2 |

Injection moulding tests were carried out on examples 10 to 16 and the results are tabulated below in Table VII for standard test mouldings, and in Table VIII for a plaque moulding. It will be noted that materials of varying properties were obtained depending upon the nature of the additional filler which was added.

EXAMPLES 17 TO 24

In these examples moulding compositions were made by adding to solid resin fillers and other additives and compounding them directly together.

The details of the compositions made are given in Table IX below. In each the dry solid resin was blended with all the other ingredients in the dry state in a morton blender without heating.

The dry mixture thus produced was compounded on differential rolls preheated to 105° C. and the sheet of compounded material from the rolls was cooled and comminuted to yield a granular product.

TABLE VII

| Example No. | 10 | 11 | 12 | 13 | 14 | 15 | 16 |
|---|---|---|---|---|---|---|---|
| Mould shrinkage % | 0.42 | 1.08 | 0.64 | 0.67 | 0.58 | 0.89 | 0.98 |
| After shrinkage % 48 hrs @ 80° C. | 0.54 | 0.64 | 0.44 | 0.67 | 0.80 | 0.47 | 0.60 |
| Boiling water absorption mg | 497.7 | 513.3 | 489.9 | 505 | 567.8 | 434.5 | 732.4 |
| Cold water absorption mg | 132.6 | 108.8 | 120.9 | 121.4 | 119.1 | 107 | 115.7 |
| Unnotched Impact Strength ($KJ/M^2$) | 5.1 | 13.1 | 9.4 | 9.0 | 9.3 | 4.8 | 6.8 |
| Notched Impact Strength ($KJ/M^2$) | 1.4 | 1.7 | — | 1.9 | 1.7 | | |
| Flexural Strength (MPa) | 168 | 126 | 146 | 133 | 90 | 110 | 114 |
| Flexural Modulus (GPa) | 11.5 | 9.0 | 11.3 | 9.6 | 7.6 | 9.3 | 9.0 |
| Fracture toughness | | | | | | | |
| KIC ($MNm^{3/2}$) | 0.68 | 1.21 | 0.97 | 1.36 | 1.01 | 0.95 | 1.41 |
| EI ($KJ/m^2$) | 0.10 | 0.23 | 0.15 | 0.29 | 0.18 | 0.15 | 0.22 |
| ET ($KJ/m^2$) | 0.15 | 0.38 | 0.23 | 0.50 | 0.34 | 0.24 | 0.38 |
| Electric strength (MV/m) | 6.96 | 5.38 | 7.39 | 5.39 | 5.59 | 5.6 | 5.78 |
| Appearance: | | | | | | | |
| Weld lines Graded 0-5 | 5 | 1 | 5 | 3 | 0 | 2 | 0 |

0 = none
5 = very bad weld lines

In this table the results are given for a fracture toughness slow bend test in which $K_{IC}$ is the force required to initiate a crack, $E_I$ is the energy absorbed on initiation of cracking, $E_T$ is the total energy absorbed.

TABLE VIII

| Example No. | 10 | 11 | 12 | 13 | 14 | 15 | 16 |
|---|---|---|---|---|---|---|---|
| Plaque moulding | | | | | | | |
| Apparent Cure (sec) | 15 | 15 | 15 | 15 | 15 | 10 | 15 |
| Injection fill time (sec) | 1.5 | 1.0 | 4.6 | 1.2 | 2 | 2.6 | 0.8 |
| Screw back time (sec) | 5 | 5.1 | 5.5 | 6 | 5.4 | 5.0 | 5.0 |
| Feed required (inch) | 2¼ | 1⅞ | 2 | 1⅞ | 2¼ | 2.0 | 1⅞ |
| Mould shrinkage across flow % | 1.02 | 0.96 | 0.87 | 0.96 | 1.17 | 1.00 | 1.00 |
| Mould shrinkage with flow % | 0.9 | 0.91 | 1.01 | 0.69 | 0.64 | 0.82 | 1.00 |
| After shrinkage at 80° C. for 48 hrs | | | | | | | |
| across the flow % | 1.08 | 1.43 | 0.92 | 1.54 | 1.21 | 0.92 | 1.1 |
| with the flow % | 1.08 | 0.87 | 0.84 | 0.87 | 1.08 | 0.78 | 0.58 |
| After shrinkage at 100° C. for 48 hrs | | | | | | | |
| across the flow % | 1.79 | 0.96 | 0.7 | 1.79 | 1.85 | 0.54 | 0.58 |
| with the flow % | 1.53 | 1.16 | 1.24 | 1.90 | 1.57 | 0.99 | 1.35 |
| stoving at 80° C. (days) | 6-7 | 21 | 4 | 21 | 23 | 21 | 21 |
| stoving at 100° C. (days) | 5 | 5 | 2 | 5 | 6 | 7 | 6 |

TABLE IX

| Example No. | 17 | 18 | 19 | 20 | 21 | 22 | 23 | 24 |
|---|---|---|---|---|---|---|---|---|
| Solid urea resin % | 50 | 50 | 50 | 78 | 70 | 70 | 70 | 62 |
| Aqueous urea resin % | | | | | | | | |
| Cellulose % | | | | 22 | 22 | 22 | | |
| Woodflour % | | | | | | | 30 | 30 |
| Barium Sulphate % | 5 | | | | 8 | | — | 8 |
| China clay % | 40 | | | | | 8 | | |
| Coated calcium carbonate % | | 25 | 20 | | | | | |
| Glass fibre 4 mm % | | 25 | 10 | | | | | |
| Terylene fibre 12 mm % | 5 | | | | | | | |
| Talc % | | | | | | | | |
| Fibre content % | 5 | 25 | 10 | 22 | 22 | 22 | 30 | 30 |
| Zinc stearate % | 0.4 | 0.5 | 0.5 | 0.4 | 0.4 | 0.4 | 0.4 | 0.3 |
| Hexamine % | 0.2 | 0.25 | 0.25 | 0.35 | 0.35 | 0.35 | 0.35 | 0.21 |
| Polypropylene glycol % | — | — | — | — | — | — | — | — |
| Catalyst masterbatch B3 % | — | — | — | — | — | — | — | — |
| Phthalic anhydride % | 0.1 | 0.25 | 0.12 | 0.20 | 0.20 | 0.20 | 0.20 | 0.13 |

The solid urea-formaldehyde resin in these examples was a resin having a degree of condensation of 31.1%, a molar ratio of U:F of 1:1.36 and contained as modifier 1.8% by weight of para-toluene sulphonamide and 1.0% by weight of a solid melamine-formaldehyde commercially available from BIP Chemicals Limited under reference BL 435. The softening point of the solid urea-formaldehyde resin was 67° C.

Tests were carried out on the moulding materials produced, and test mouldings were made on an injection moulding machine from each composition. The results of all these tests are given in Table X below.

TABLE X

| Example No. | 17 | 18 | 19 | 20 | 21 | 22 | 23 | 24 | 4 |
|---|---|---|---|---|---|---|---|---|---|
| Powder Tests | | | | | | | | | |
| Disc flow (thou) | 030 | 008 | 005 | 004 | 009 | 008 | 013 | 011 | 024 |
| Orifice flow (sec) | 14 | 5 | 4 | 5 | 3 | 5 | 4 | 5 | N/F |
| Total water content % | 4.5 | 4.5 | 4.4 | 7.6 | 6.3 | 6.3 | 7.0 | 6.4 | 7.5 |
| Free water content % | 1.00 | 1.00 | 1.1 | 1.3 | 1.2 | 0.9 | 1.4 | 1.5 | 0.5 |
| Injection Moulding physical properties | | | | | | | | | |
| Mould shrinkage % | 0.6 | 0.6 | 0.3 | 0.98 | 0.98 | 0.78 | 0.85 | 1.03 | 1.1 |
| After shrinkage 48 hrs @ 80° C. | 0.5 | 0.12 | 0.29 | 0.3 | 0.5 | 0.3 | 0.4 | 0.3 | 0.6 |
| Boiling water absorption mg | 496 | 496 | 582 | 715 | 688 | 664 | 679 | 624 | 541 |
| Cold water absorption mg | 103.8 | 809 | 137 | 368 | 277 | 330 | 216 | 182 | 99 |
| Notched impact strength $KJ/m^2$ | 1.8 | 2.56 | 2.6 | 1.8 | 2.1 | 2.4 | 1.7 | 1.9 | |
| Unnotched impact strength $KJ/m^2$ | 2.93 | 6.5 | 7.2 | 10.4 | 9.36 | 12.1 | 8.1 | 8.3 | 5.8 |
| Flexural strength MPa | '67 | 95 | 63 | 79 | 101 | 85 | 7.6 | 96.1 | 130 |
| Flexural modulus GPa | 11.5 | 11.7 | 11.4 | 7.1 | 7.5 | 7.8 | 7.3 | 8.4 | 10.1 |
| Kic $(MNm^{-3/2})$ | 0.95 | 3.51 | 1.49 | 1.14 | 1.42 | 1.42 | 1.20 | 1.62 | 0.5 |
| Ei $(KJ/m^2)$ | 0.11 | 0.90 | 0.23 | 0.22 | 0.3 | 0.28 | 0.23 | 0.36 | — |
| Et $(KJ/m^2)$ | 1.00 | 1.57 | 0.44 | 0.38 | 0.48 | 0.43 | 0.38 | 0.52 | — |
| Electric strength (MV/m) | 7.1 | 6.6 | 6.0 | 4.35 | 6.00 | 6.01 | 7.0 | 6.48 | 7.6 |
| Appearance | | | | | | | | | |
| Weld lines 0 = none 5 = very bad | 1 | 0 | 0 | 0 | 0 | 0 | 0 | 0 | 5 |
| Plaque moulding | | | | | | | | | |
| Stoving at 80° C. (days) | 15 | >25 | >25 | >25 | >25 | >25 | >25 | >25 | 6 |
| Stoving at 100° C. (days) | 3 | >25 | >25 | >25 | >25 | >25 | >25 | >25 | 5 |

The table includes comparable results for the composition used in Example 4 for comparison. It may be seen from the flow characteristics of the moulding materials that they were particularly suited for injection moulding. This was borne out in the excellent appearance of the mouldings produced, and their stability under stoving in comparison with the material produced wholly from aqueous resin.

We claim:

1. A method for the manufacture of an amino-formaldehyde moulding composition comprising curable amino formaldehyde resin and filler in which the resin and filler are compounded together under such conditions as to leave the resin in a state in which it will flow and cure under heat and pressure and wherein the components of the composition which are compounded together comprise:
   (a) an aqueous amino-formaldehyde resin solution which is used in an amount such as to provide curable amino-formaldehyde resin to make up 0 to 90 percent by weight of the resin component of moulding composition,
   (b) at least one filler in an amount such as to make up 20 to 60 percent by weight of the moulding composition and
   (c) a urea-formaldehyde resin which is solid at room temperature and which has a degree of condensation in the range of from about 25 to about 45 percent and a softening point in the range 50° C. to 90° C. and/or which is a product of reaction of at least, urea, formaldehyde and a modifier selected from the group consisting of organic amides, amino-triazines, reactive organic hydroxyl compounds and reaction products of these compounds with formaldehyde, the solid resin making up 4 to 80 percent by weight of the moulding composition.

2. A method according to claim 1 in which the filler (b) is mixed with the aqueous resin (a) and solid resin component (c) is mixed in to the wet mixture of the filler and resin components (a) and (b), the resulting mixture being dried and ground.

3. A method according to claim 1 in which the aqueous resin (a) is mixed with filler, and the mixture is dried and ground, the solid resin being blended with the resulting powder.

4. A method according to claim 3 in which further filler is added with the solid resin to be mixed with the said powder.

5. A method according to claim 1 in which the filler comprises cellulose.

6. A dry molding composition comprising:
   a curable amino-formaldehyde resin and filler, in which
   from 0 to 90 percent by weight of the curable amino-formaldehyde resin is derived from an aqueous amino-formaldehyde resin;
   from 20 to 60 percent by weight of the molding composition is made up of at least one filler; and
   from 4 to 80 percent by weight of the molding composition is made up of a curable urea-formaldehyde resin which is solid at room temperature, has a degree of condensation in the range from about 25 percent to about 45 percent and a softening point in the range of 50° to 90° C.

7. A moulding composition according to claim 6 in which the curable solid resin is a product of reaction of urea, formaldehyde and a modifier selected from the group consisting of organic amides and reactive organic hydroxyl compounds.

8. A moulding composition according to claim 7 in which the modifier is a mono- or diamide of an aliphatic or aromatic carboxylic acid.

9. A moulding composition according to claim 8 in which the modifier is malonamide or formamide.

10. A moulding composition according to claim 8 in which the modifier is sulphanilamide, or para-toluene sulphonamide.

11. A moulding composition according to claim 6 in which the solid resin has a molar ratio of formaldehyde to urea which is less than 2.0:1.

12. A moulding composition according to claim 7 in which the amount of units derived from modifier in the solid resin is not more than 4 percent by weight of the resin.

13. A moulding composition according to claim 6 which also includes a further resin, compatible with the resins (a) and (c) in an amount up to 20 percent by weight.

14. A moulding composition according to claim 13 in which the further resin is a solid melamine-formaldehyde resin having a softening point in the range 70° to 120° C.

15. A moulding composition according to claim 13 in which the further resin is a polyester alkyd resin.

* * * * *